Patented July 7, 1925.

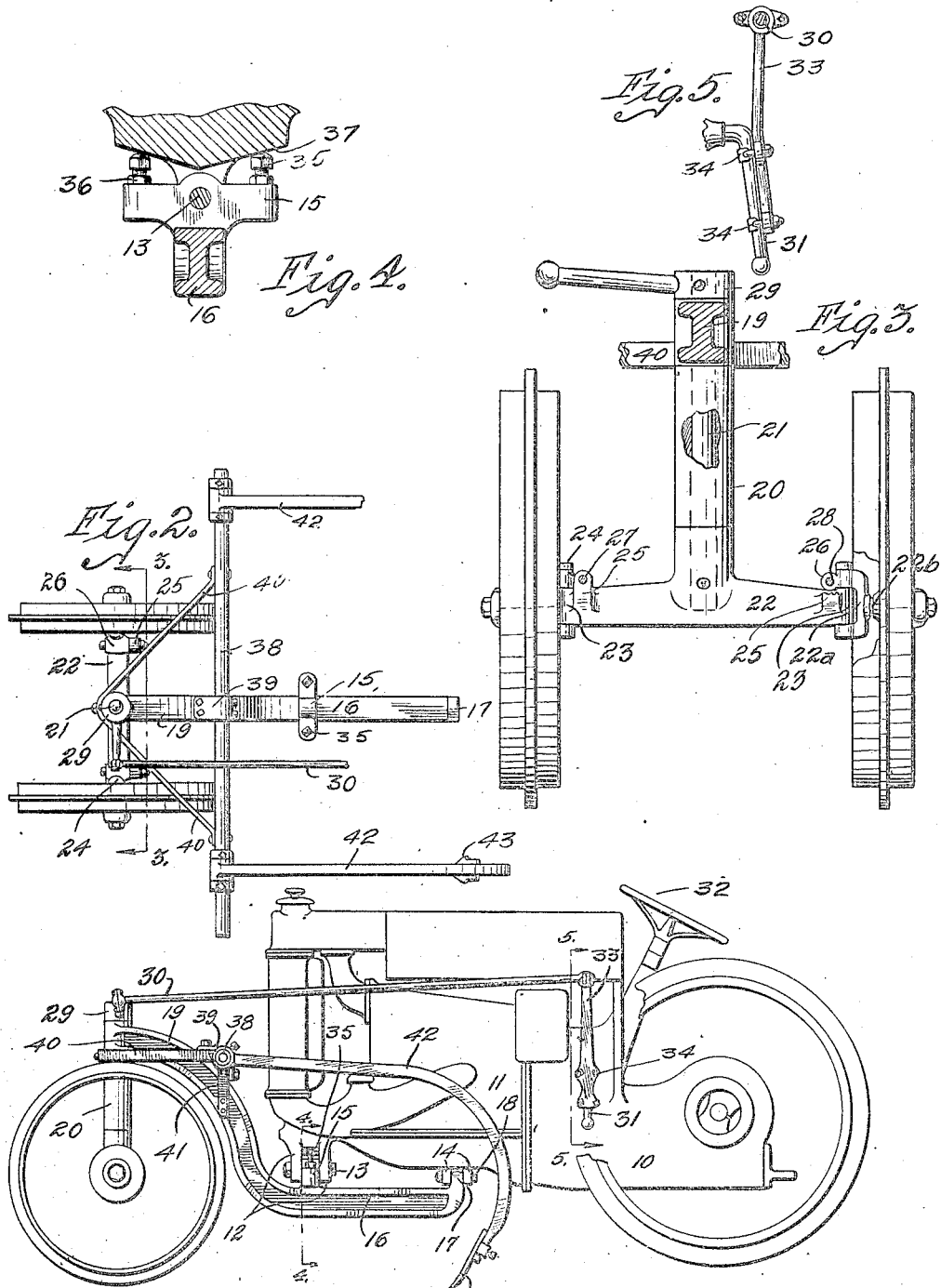

1,545,167

UNITED STATES PATENT OFFICE.

JOHN LOUIS OPITZ, OF CLARINDA, IOWA.

AUXILIARY SUPPORTING AND STEERING ATTACHMENT FOR TRACTORS.

Application filed August 18, 1924. Serial No. 732,708.

*To all whom it may concern:*

Be it known that I, JOHN LOUIS OPITZ, a citizen of the United States, and a resident of Clarinda, in the county of Page and State of Iowa, have invented a certain new and useful Auxiliary Supporting and Steering Attachment for Tractors, of which the following is a specification.

The object of my invention is to provide an auxiliary supporting and steering mechanism for tractors of simple, durable and inexpensive construction, which may be easily and quickly applied.

More specifically it is the object of my invention to provide a device in the nature of an attachment which may be substituted for the front axle of a small farm tractor, and so arranged that after the device is attached, it is adapted to carry farm implements such as cultivator shanks, and at the same time provide means for supporting the front wheels so that they may be placed close together and adapted to pass between the rows of plants.

A further object is to provide an improved axle arrangement for tractors which may be substituted for the front axle, having means whereby the front wheels and the spindle of the ordinary axle may be easily and quickly applied to the substituted axle.

A further object is to provide a substitute front axle for small farm tractors, said axle being comparatively short so that the wheels may be spaced close together, and to provide in connection with a tractor improved means for steering the said substitute axle.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of one form of a small farm tractor to which my device is particularly adapted, showing my improved device mounted thereon.

Figure 2 is a plan view of the attachment.

Figure 3 is a detail sectional view taken on the line 3—3 of Figure 2.

Figure 4 is a detail sectional view taken on the line 4—4 of Figure 1.

Figure 5 is a detail sectional view taken on the line 5—5 of Figure 1.

The numeral 10 indicates a small type of tractor, such as is in common use for operating farm machinery. The numeral 11 indicates the main body portion of the engine, having beneath its forward end two downwardly projecting lugs 12 which are spaced apart and designed to pivotally receive between them the front axle of the tractor by means of a pivot pin 13.

To apply my device, the front end of the body portion of the tractor is jacked up and the original axle is removed by removing the pin 13 and disconnecting the radius rod, which is supported between two lugs 14 beneath the body portion of the tractor.

My device comprises a stub axle member 15 which is substituted for the original axle and placed between the lugs 12 and secured thereto by means of the pin 13. Formed integral with the said stub axle 15 and extending longitudinally with the tractor is a supporting beam 16, the rear end of which is provided with an upwardly extending lug 17 designed to rest between the lugs 14, the said lug 17 being secured therein by a pin 18.

The forward end of the beam 16 is provided with an upwardly and outwardly curved neck portion 19, the free end of which is provided with a downwardly extending sleeve 20 having a rotatively mounted shaft 21, the lower end of which is rigidly supported in an auxiliary axle 22, so that the said axle is free to swing about a vertical axis. Each end of the axle 22 is provided with a vertically arranged opening 23, the end of the axle being of such width as to be received between the yoke members 22ª of the front spindle 22ᵇ. The said spindle is removed from the original axle and placed in position on the auxiliary axle and secured thereto by means of a spindle pin 24 extending through the opening 23.

Adjacent to one side of the end of the axle 22 is an upwardly extending lug 25 designed to rest adjacent to the arm supporting lug 26 of the spindle 22ᵇ, said lug 25 having an opening 27. The lugs 25 and 26 are designed to receive a bolt 28. This provides means whereby the wheel spindles are rigidly secured to the axle member 22.

By this arrangement is will be seen that the wheels may be easily and quickly removed from the original axle by simply removing the spindle bolts and arms and securing them to the said auxiliary axle in the manner as above described.

The upper end of the shaft 21 is provided with a horizontally extending arm 29, the free end of which is pivotally connected to a link 30 which extends parallel with one side of the tractor. The tractor is provided with a steering arm 31 which extends downwardly and is free to have its lower end moved forwardly and rearwardly by means of the steering wheel 32, the said lower end being provided with a link which extends to the ordinary steering mechanism. This link is also removed.

I have provided an auxiliary steering arm 33, the lower end of which is provided with U-bolts 34 designed to surround the arm 31 in such a manner that the auxiliary arm 33 is rigidly connected thereto and having its upper end extended upwardly beyond the pivotal center of the arm 31. The upper end of the arm 33 is pivotally connected to the back end of the link 30. This provides means whereby the front axle 22 may be steered by the ordinary steering wheel.

By providing the upwardly extending arm 33, the tractor may be guided in the same direction by a given movement of the steering wheel 32, as would have been produced by the original arrangement. Whereas, if the link 30 was connected directly to the lower end of the arm 31, the steering would have been in the opposite direction. This also places the link 30 in a nearer horizontal position.

To maintain the shaft 21 in a common vertical plane with the body of the tractor, I have provided set screws 35 which are mounted on the outer ends of the stub axle 15, said set screws being provided with lock nuts 36 so arranged that the heads of the screws 35 will engage the inclined members 37, which are mounted on the casting which supports the lugs 12. By this arrangement the shaft 21, together with the sleeve 20, will be rigidly supported relative to the body portion of the tractor.

The neck portion 19, together with the beam 15, is adapted to support various forms of devices for carrying farm tools, one form of which I have illustrated herewith, and which consists of a shaft 38 extending transversely above the neck 19 and in front of the tractor frame, said shaft being supported by means of a bracket 39 and brace members 40, said braces being secured to the forward face of the sleeve 20. Braces 41 may also be provided for maintaining the shaft 38 in a horizontal plane. The outer end of the shaft 38 is provided with a cultivator beam 42 which is provided with shovels 43 designed to operate opposite each side of the tractor frame. Any number of these beams may be provided at the outer end of the shaft 38. Any suitable raising device may be constructed for elevating and lowering the shovels. This forms no part of my present invention and for that reason is not illustrated.

It will, therefore, be seen that I have provided an auxiliary supporting and steering device for farm tractors, which may be easily and quickly substituted for the regular axle, and which is particularly designed to carry the same wheels and spindles as provided for the orginal axle. The device is adapted to carry farm implements which may be easily and quickly attached or detached by simply attaching the auxiliary axle. The said auxiliary axle may be of any desired length to accommodate crops of any kind, such as corn, sugar beets, or cotton.

I claim as my invention:

1. In a device of the class described, a beam member having a neck portion, means for detachably supporting the beam member to a tractor in place of the front axle, an auxiliary axle pivotally connected with the said neck portion, a steering device for said auxiliary axle, and a frame member carried by said beam and neck portion, said frame member being adapted to draw a farm implement.

2. In a device of the class described, a horizontally extending beam member having one end provided with an upwardly extending lug, said lug having a horizontally extending opening, the opposite end of said horizontal beam having its upper surface provided with a laterally extending stub axle, the said stub axle being provided with a longitudinal opening, each outer end of said stub axle being provided with an upwardly extending set screw, the forward end of said beam being provided with an upwardly and forwardly curved neck portion, the end of said neck portion being provided with a downwardly extending sleeve, a shaft for said sleeve, an auxiliary axle rigidly connected to the lower end of said shafts, each end of said axle being provided with a vertical opening, and a lug adjacent to one face and extending above the upper surface of said axle, each of said lugs being provided with a horizontal opening, and a steering arm for the upper end of said vertical shaft.

3. In a device of the class described, a horizontally extending beam member having one end provided with an upwardly extending lug, said lug having a horizontally extending opening, the opposite end of said horizontal beam having its upper surface provided with a laterally extending stub axle, the said stub axle being provided with a longitudinal opening, each outer end of said stub axle being provided with an upwardly extending set screw, the forward end of said beam being provided with an upwardly and forwardly curved neck portion, the end of said neck portion being provided with a downwardly extending sleeve, a shaft for said sleeve, an auxiliary axle rigidly connected to the lower end of said shafts, each end of said axle being provided with a vertical opening, a lug adjacent to one face and extending above the upper surface of said axle, each of said lugs being provided with a horizontal opening, a steering arm for the upper end of said vertical shaft, a transversely arranged shaft connected to the upper face of said neck portion, and brace members for rigidly securing the shaft in a horizontal and transverse position.

4. In a device of the class described, a horizontally extending beam member having one end provided with an upwardly extending lug, said lug having a horizontally extending opening, the opposite end of said horizontal beam having its upper surface provided with a laterally extending stub axle, the said stub axle being provided with a longitudinal opening, each outer end of said stub axle being provided with an upwardly extending set screw, the forward end of said beam being provided with an upwardly and forwardly curved neck portion, the end of said neck portion being provided with a downwardly extending sleeve, a shaft for said sleeve, an auxiliary axle rigidly connected to the lower end of said shafts, each end of said axle being provided with a vertical opening, a lug adjacent to one face and extending above the upper surface of said axle, each of said lugs being provided with a horizontal opening, a steering arm for the upper end of said vertical shaft, a transversely arranged shaft connected to the upper face of said neck portion, brace members for rigidly securing the shaft in a horizontal and transverse position, and means for operatively connecting the free end of said steering arm to the steering arm of a tractor.

5. In combination, a tractor having a body portion and an oscillating steering arm, the under surface of said body portion being provided at its forward end with a pair of downwardly extending lugs and at its central portion with a second pair of downwardly extending lugs, a horizontal beam extending longitudinally with said tractor and beneath said lugs, the rear end of said beam being provided with an upwardly extending lug to rest between the second pair of downwardly extending lugs of said tractor body, the forward end of said beam being provided with a stub axle pivotally mounted between the first said downwardly extending lugs of said tractor, the forward end of said beam being provided with an upwardly and forwardly extending curved neck, the forward end of said neck having a downwardly extending sleeve, a vertical shaft for said sleeve, an auxiliary axle rigidly connected to the lower end of said vertical shaft, means for detachably connecting wheel spindles with each end of said auxiliary axle, a steering arm for the upper end of said vertical shaft, a link for said steering arm, an auxiliary steering arm for the opposite end of said link, and means for detachably connecting the auxiliary steering arm with the steering arm of said tractor.

6. In combination, a tractor having a body portion and an oscillating steering arm, the under surface of said body portion being provided at its forward end with a pair of downwardly extending lugs and at its central portion with a second pair of downwardly extending lugs, a horizontal beam extending longitudinally with said tractor and beneath said lugs, the rear end of said beam being provided with an upwardly extending lug to rest between the second pair of downwardly extending lugs of said tractor body, the forward end of said beam being provided with a stub axle pivotally mounted between the first said downwardly extending lugs of said tractor, the forward end of said beam being provided with an upwardly and forwardly extending curved neck, the forward end of said neck having a downwardly extending sleeve, a vertical shaft for said sleeve, an auxiliary axle rigidly connected to the lower end of said vertical shaft, means for detachably connecting wheel spindles with each end of said auxiliary axle, a steering arm for the upper end of said vertical shaft, a link for said steering arm, an auxiliary steering arm for the opposite end of said link, means for detachably connecting the auxiliary steering arm with the steering arm of said tractor, a transversely arranged shaft rigidly secured to said neck portion, and a cultivator shank pivotally connected to each outer end of said shaft.

Des Moines, Iowa, August 11, 1924.

JOHN LOUIS OPITZ.